US006395885B1

(12) United States Patent
Lavery et al.

(10) Patent No.: US 6,395,885 B1
(45) Date of Patent: May 28, 2002

(54) USE OF LITHIUM SALTS OF ANIONIC DYES TO ENHANCE THEIR LIGHT-FASTNESS

(75) Inventors: Aidan Joseph Lavery, High Wycombe; Janette Watkinson, Blackley, both of (GB); John Parker Meyers, New Castle, DE (US)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/701,901

(22) PCT Filed: May 28, 1999

(86) PCT No.: PCT/GB99/01483

§ 371 (c)(1),
(2), (4) Date: Dec. 5, 2000

(87) PCT Pub. No.: WO99/64526

PCT Pub. Date: Dec. 16, 1999

(30) Foreign Application Priority Data

Jun. 5, 1998 (GB) .............................................. 9812119

(51) Int. Cl.[7] .......................... C09B 69/02; C09B 67/24; C09D 11/02
(52) U.S. Cl. ........................ 534/634; 534/638; 534/797; 534/802; 534/817; 534/829; 534/840; 534/845; 106/31.47; 106/31.51; 106/31.52
(58) Field of Search .................................. 534/634, 638, 534/797, 802, 817, 829, 840, 845; 106/31.47, 31.51, 31.52

(56) References Cited

U.S. PATENT DOCUMENTS

| 3,635,944 | A | | 1/1972 | Litke ........................... 534/836 |
| 4,626,284 | A | | 12/1986 | Ohta et al. ................ 106/31.52 |
| 4,703,113 | A | | 10/1987 | Baxter et al. ................ 534/796 |
| 4,707,545 | A | * | 11/1987 | Meininger et al. ........... 534/588 |
| 5,011,917 | A | * | 4/1991 | Opitz et al. .................. 534/583 |
| 5,542,970 | A | | 8/1996 | Miura et al. ............. 106/31.43 |

FOREIGN PATENT DOCUMENTS

| DE | 1 950 097 | 4/1970 |
| DE | 37 13052 | 10/1987 |
| EP | 014 180 | 8/1980 |
| EP | 061 025 | 9/1982 |
| EP | 129 797 | 1/1985 |
| EP | 183 142 | 6/1986 |
| EP | 246 763 | 11/1987 |
| EP | 284 009 | 9/1988 |
| EP | 357 915 | 3/1990 |
| EP | 415 581 | 3/1991 |
| EP | 425 150 | 5/1991 |
| GB | 1 318 111 | 5/1973 |

OTHER PUBLICATIONS

Chemical Abstracts, 97:111284, 1982.*
Suga et al., Chemical Abstracts, 108:58067, 1988.*
Kawashita et al., Chemical Abstracts, 116:85883, 1992.*
Arita et al., Chemical Abstracts 129:123901, 1998.*
Patent Abstracts of Japan: vol. 013, No. 042, (C–564) Jan. 30, 1989 & JP 63 241071, Oct. 6, 1988.

* cited by examiner

Primary Examiner—Fiona T. Powers
(74) Attorney, Agent, or Firm—Pillsbury Winthrop LLP

(57) ABSTRACT

The use of lithium as a cation for an anionic dye to enhance the light-fastness of the dye. Also claimed are the lithium salts of certain anionic dyes as defined in the description; mixed lithium/sodium salts of an anionic dye wherein the molar ratio of lithium to sodium is from 1:4 to 99:1 and at least 20 mole % of the total counter ions in the dye are lithium cations; inks containing the dyes; a method of ink jet printing using the inks; a substrate printed with the inks; an ink jet printer cartridge containing the ink and a ink jet printer containing the ink jet printer cartridge.

11 Claims, No Drawings

USE OF LITHIUM SALTS OF ANIONIC DYES TO ENHANCE THEIR LIGHT-FASTNESS

This invention relates to dyes, to inks and to their use in ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

There is a growing demand for wide format prints which are prepared using ink jet printing. Wide format prints are often located outdoors, for example on advertising billboards, where they may be exposed to sunlight for long periods of time. It is therefore desirable that the prints exhibit a high light-fastness to minimise fading.

We have found that lithium salts of anionic dyes exhibit a surprisingly high light-fastness particularly when the dyes are incorporated into inks for use in ink jet printers. We have also found that when lithium is used in conjunction with sodium as cations in anionic dyes, the dyes exhibit a surprisingly high aqueous solubility and a high light-fastness.

According to a first aspect of the present invention there is provided the use of lithium as a cation for an anionic dye to enhance the light-fastness of the dye.

The lithium cation may be used as the sole cation for the anionic dye or in combination with other cations. For example, the lithium cation may be used together with another alkali metal cation (preferably potassium and especially sodium cations), with ammonium or with a quaternary ammonium cation.

The light-fastness of the dye generally increases as the proportion of lithium cations in the total pool of cations increases. Preferably, at least 20 mole %, more preferably at least 50 mole %, still more preferably at least 60 mole % of the cations in the anionic dye are lithium cations. In one embodiment substantially all of the cations in the dye are lithium cations.

In a second embodiment the lithium is used in combination with sodium as a cations for the anionic dye. We have found that the mixed lithium/sodium salts provide anionic dyes with a high light-fastness and a high aqueous solubility. Preferably the molar ratio of lithium to sodium cations in the anionic dye is from 1:4 to 99:1, more preferably from 1:4 to 3:1 and especially from 1:3 to 1.5:1, more especially from 1:2 to 1:1. This preferred ratio of lithium to sodium cations provides an anionic dye which exhibits an unexpectedly high light-fastness and water-fastness compared to the individual sodium and lithium salts of the dye.

When lithium is used in combination with sodium as the cations for an anionic dye preferably and at least 20 mole % of the total cations in the dye are lithium.

Preferably the anionic dye is a water-soluble anionic dye. Preferred water-soluble anionic dyes are water-soluble anionic direct, reactive and acid dyes, more preferably water-soluble anionic azo, bis azo and tris azo dyes which preferably contain one group, more preferably two or more groups, selected from carboxy, sulpho and phosphono.

It is especially preferred that the water-soluble anionic dye contains at least as many carboxy groups as sulpho groups.

According to a second aspect of the present invention there is provided a dye selected from C.I. Reactive Red 180, C.I. Acid Red 52 and a dye having one of the Formulae (1) to (9), wherein the dye is in the lithium salt form:

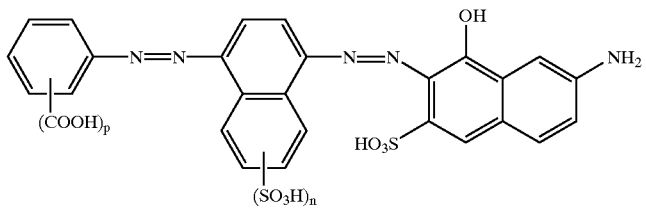

Formula (1)

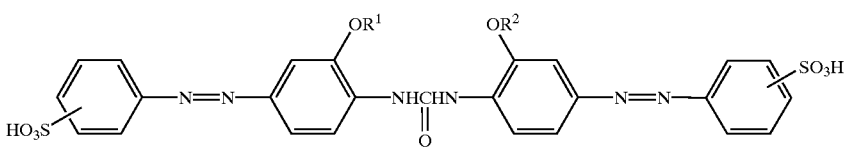

Formula (2)

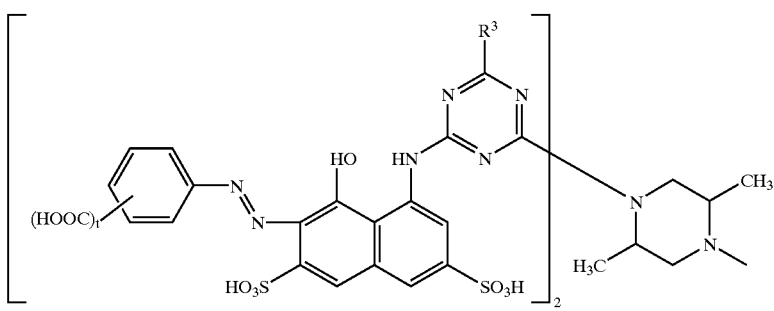

Formula (3)

-continued

Formula (4)
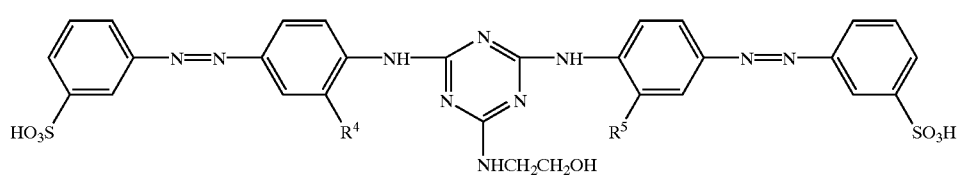

Formula (5)
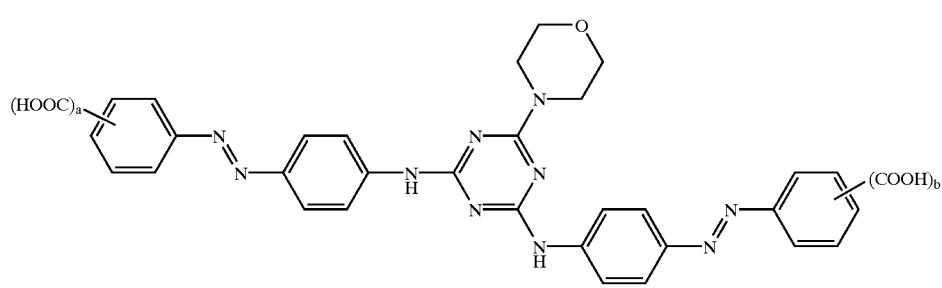

Formula (6)
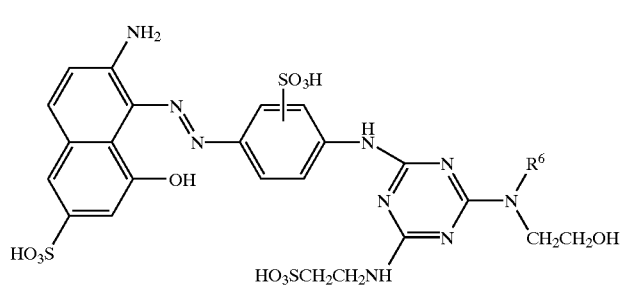

Formula (7)
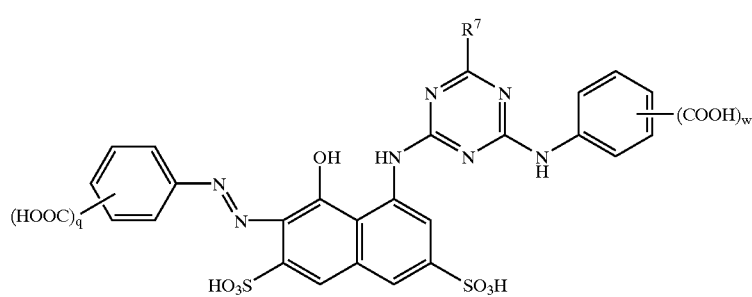

Formula (8)
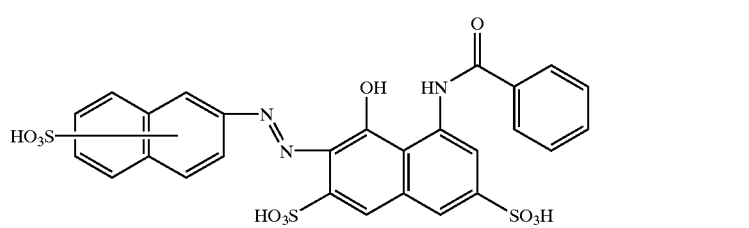

Formula (9)
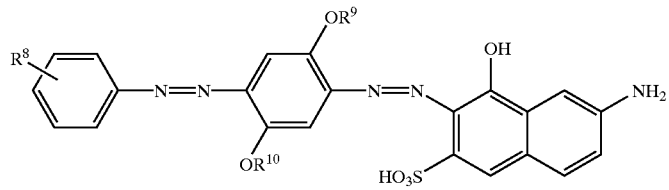

wherein:
$R^1$ and $R^2$ each independently is $C_{1-4}$-alkyl;
each $R^3$ independently is alkoxy, —OH, —Cl or amino;
$R^4$ and $R^5$ each independently is $C_{1-4}$-alkoxy;
$R^6$ is H or hydroxyethyl;
$R^7$ is —OH, —Cl, or $C_{1-4}$-alkoxy;
$R^8$ is —COOH, —SO$_3$H or —PO$_3$H$_2$;
$R^9$ and $R^{10}$ each independently is methyl or ethyl;
p is 1 or 2;
n is 0 or 1;
q and w each independently is 1 or 2;

a and b each independently is 1 or 2; and
each t independently is 1 or 2.

Preferably n is 0.

Preferably p is 2. More preferably p is 2 and each —COOH is meta to the azo group (—N=N—) in Formula (1).

$R^1$ and $R^2$ are preferably methyl or ethyl, more preferably methyl. Preferably the —SO$_3$H groups in Formula (2) are attached at the meta position relative to each azo group.

Preferably each t is 2. More preferably each t is 2 and the —COOH groups are at the 3- and 5-positions in each phenyl group in Formula (3). Preferably $R^3$ is —OH or $C_{1-4}$-alkoxy, more preferably —OH or methoxy and especially —OH.

$R^4$ and $R^5$ are preferably methoxy.

Preferably a and b are 2, more preferably a and b are 2 and each —COOH is attached meta to each azo group (—N=N—) in Formula (5).

Preferably $R^6$ is hydroxyethyl, more preferably $R^6$ is hydroxyethyl and the —SO$_3$H group on the phenyl ring is attached in the ortho position relative to the azo group.

Preferably $R^7$ is —OH.

Preferably $R^8$ is —COOH or —PO$_3$H$_2$. It is especially preferred that $R^8$ is meta to the azo group in Formula (9).

In view of the foregoing preferences, a preferred dye according to the second aspect of the present invention is the lithium salt of a dye having one of the Formulae (10) to (21):

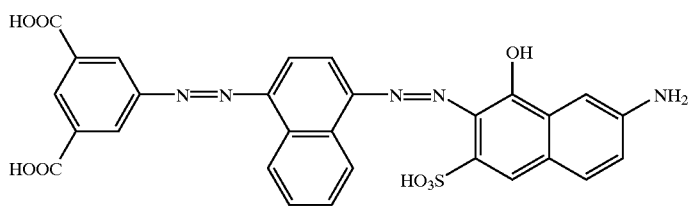

Formula (10)

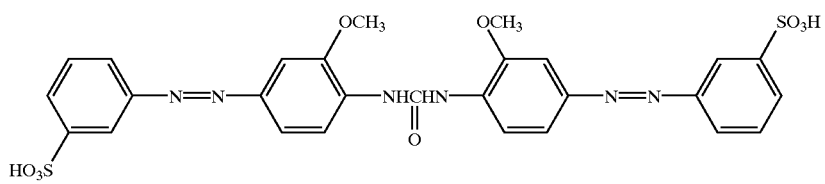

Formula (11)

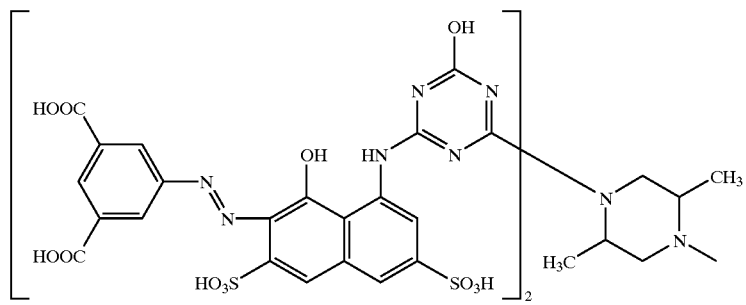

Formula (12)

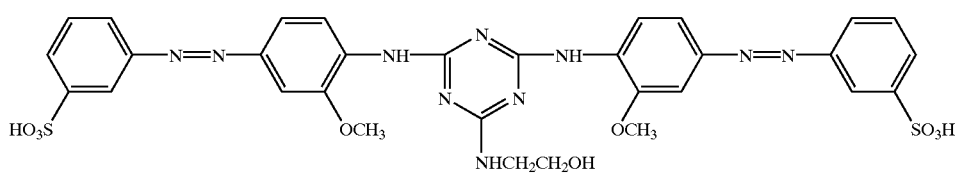

Formula (13)

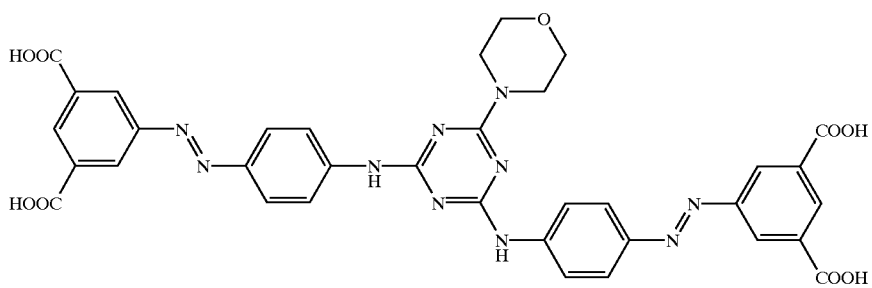

Formula (14)

-continued

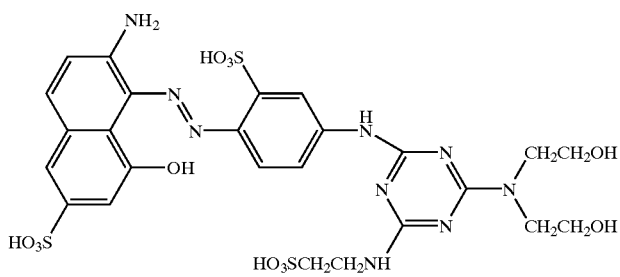

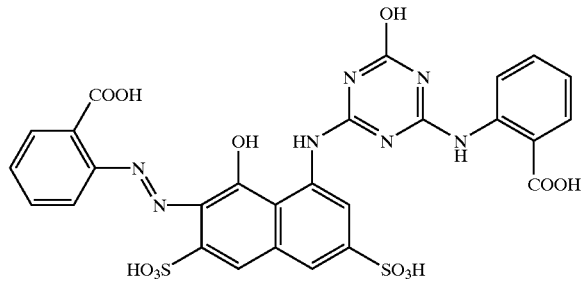

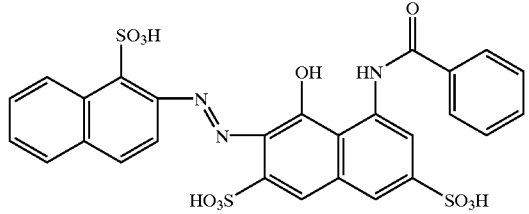

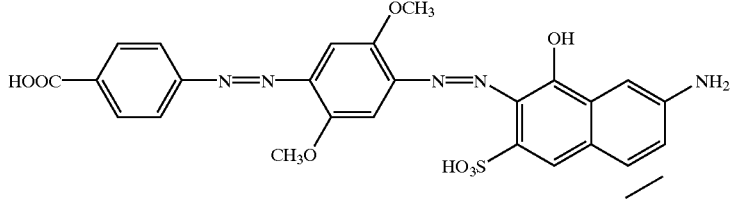

Formula (15)

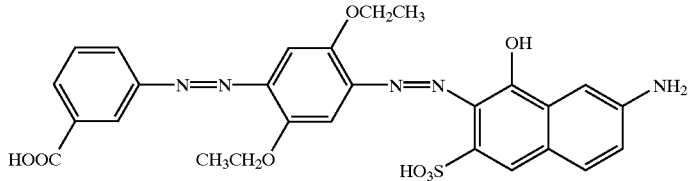

Formula (16)

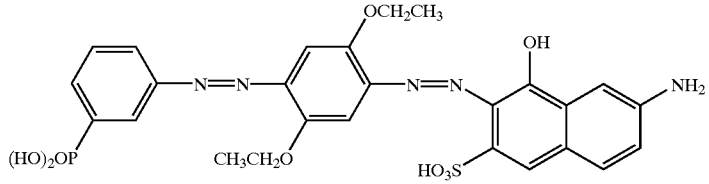

Formula (18)

Formula (19)

Formula (20)

Formula (21)

It is especially preferred that the dye according to the second aspect of the present invention is selected from the lithium salt of a dye of the Formula (10), (11) and (12), because these dyes exhibit a particularly high light-fastness.

Preferably in this second aspect of the invention substantially all of the —COOH, —SO$_3$H and —PO$_3$H$_2$ groups shown in the dyes of the Formulae (1) to (21) are in the lithium salt form. Accordingly, in the dyes according to the second aspect of the invention preferably all the carboxy groups are present as —COOLi, all the sulpho groups are present as —SO$_3$Li and all the phosphono groups are present as —PO$_3$Li$_2$.

The dyes of the Formulae (1) to (21) may be prepared by methods which directly result in the lithium salt. Alternatively the dyes may be prepared in the form of a salt with a cation other than lithium, for example the sodium or potassium salt, followed by conversion into the lithium salt using conventional techniques, preferably, reverse osmosis, nanofiltration, electrodialysis, dialysis, an ion exchange technique or by precipitating the dye in free acid form followed by neutralising with LiOH.

An example of a suitable technique for converting a dye in the form of a salt with a cation other than the lithium into its lithium salt comprises passing a solution of the alternative salt of a dye of Formula (1) to (21) through an acid loaded ion exchange resin to give the free acid form of the dye. A solution/suspension of the free acid form of the dye is then neutralised with a molar excess of lithium hydroxide to give the lithium salt.

The lithium salt of the dyes of Formula (1) may be prepared in the form of their sodium salts using an analogous process to that disclosed in Example 2 of EP 0 356 080. The sodium salt may then be converted to the lithium salt using any of the hereinbefore defined methods.

The lithium salt of the dye of Formula (2) may be prepared by diazotising a sulphoaniline (for example using $NaNo_2$ in dilute mineral acid at below 5° C.) and coupling with a compound of the formula:

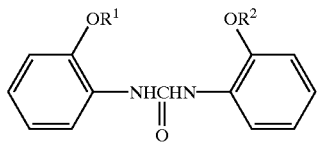

wherein $R^1$ and $R^2$ are as hereinbefore defined, followed by conversion to the lithium salt as hereinbefore described. Certain dyes of Formula (2) are commercially available in the form of their sodium salts, for example C.I. Direct Yellow 132.

The lithium salt of the dye of Formula (3) may be prepared using an analogous process to that described in example 3 of PCT publication number WO 94/16021, followed by conversion into the lithium salt.

The lithium salt of the dye of Formula (4) may be prepared by condensing hydroxyethylamine with a chlorotriazine analogue of the compound of Formula (4) in which there is a Cl atom in place of the hydroxyethylamino group, followed by conversion into the lithium salt. The chlorotriazine analogue may be prepared by condensing 2 moles of a compound of Formula (A) with one mole of cyanuric chloride:

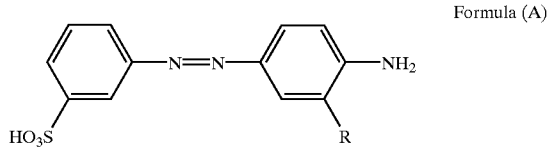

Formula (A)

wherein R is as hereinbefore defined for $R^4$ and $R^5$.

The compound of Formula (A) may be prepared by diazotising a sulphoaniline and coupling onto aniline substituted by a $C_{1-4}$-alkoxy group at the 2-position.

Certain dyes of Formula (4) are commercially available as a sodium salt, for example C.I. Direct Yellow 142.

The lithium salt of the dye of Formula (5) may be prepared using an analogous process to that described in example 10 of EP 468 747 followed by conversion into the lithium salt. Certain dyes of the Formula (5) are commercially available in as of their sodium salt, for example CI Direct Yellow 173.

The lithium salt of the dye of Formula (6) may be prepared using conventional techniques, for example by the method described on pages 5 and 6 and Example 1 of PCT publication number WO 96/24636, followed by conversion into the lithium salt.

The lithium salt of the dye of Formula (7) may be prepared using conventional techniques, for example, using the method described on pages 17 and 18 and Example 1 of EP 0 628 088, followed by conversion to the lithium salt as hereinbefore defined.

The lithium salt of the dye of Formula (8) may be prepared by, for example, using the method disclosed in U.S. Pat. No. 5,542,970, cols. 12 to 15, followed by conversion into the lithium salt.

The lithium salt of the dye of Formula (9) may be prepared using conventional techniques, for example the methods disclosed in EP 0 761 771, pages 1.1 to 16, and U.S. Pat. No. 5,198,022, cols. 3 to 6 followed by conversion into the lithium salt.

C.I. Reactive Red 180 and C.I. Acid Red 52 are all commercially available in the free acid form or as salts with sodium. The sodium salt may then be converted to the lithium salt using any of the hereinbefore defined methods.

The dyes may exist in tautomeric forms other than those shown in this specification. These tautomers are included within the scope of the present claims.

According to a third aspect of the present invention there is provided an anionic dye in the form of a salt with a mixture of cations wherein:

(i) the cations comprise a mixture of lithium and sodium cations;

(ii) at least 20 mole % of the total cations are lithium cations; and (iii) the molar ratio of the lithium to sodium cations is from 1:4 to 99:1.

The anionic dye salts according to the third aspect of the invention exhibit surprisingly high light-fastness and good solubility in aqueous media compared to the light-fastness and solubility of the individual sodium and lithium salts of the anionic dye.

Preferably the anionic dye according to the third aspect of the present invention is an anionic direct, reactive or azo dye, more preferably an anionic azo, bis azo, tris azo or xanthene dye, and especially an anionic azo or bis azo dye.

In a first preferred embodiment of the third aspect of the invention the anionic dye is selected from C.I. Direct Black 19, C.I. Reactive Red 180, C.I. Acid Red 52 and a dye having one of the Formulae (1) to (9) as hereinbefore defined in relation to the second aspect of the present invention.

An especially preferred anionic dye in this first preferred embodiment of the third aspect of the present invention has any one of the of the Formulae (10) to (21), more especially of the Formula (11) or (14) as defined in relation to the second aspect of the invention. These preferred anionic dyes have a particularly high aqueous solubility and provide prints which exhibit a good light-fastness when they are in the form of a salt as hereinbefore defined in this third aspect of the invention.

Preferably the molar ratio of lithium to sodium cations in the anionic dye salt according to the third aspect of the invention is from 1:4 to 3:1, more preferably from 1:3 to 1.5:1 and especially from 1:2 to 1:1.

The anionic dye salt according to the third aspect of the invention may have other cations in addition to the sodium and lithium cations. For example the dye may contain sodium, lithium and one or more additional cations selected from potassium, ammonium and quaternary ammonium cations. It is preferred however, that the anionic dye salt according to the third aspect of the invention is substantially free from cations other than sodium and lithium.

The anionic dye salt according to the third aspect of the invention is preferably prepared by mixing the sodium and lithium salts of the anionic dyes to give the required ratio of lithium and sodium ions. Alternatively the anionic dye salt may be prepared by conversion of the sodium salt of the anionic dye to the mixed lithium/sodium salt using a conventional technique, for example by adding an appropriate quantity of LiOH to an aqueous solution of the sodium salt followed by removal of the unwanted inorganic sodium salts, for example by dialysis or reverse osmosis.

Preferably the dyes according to the second and third aspects of the invention are purified to remove impurities, especially di- and trivalent metals, for example calcium and magnesium. It is especially preferred that the dyes contain less than 50, more preferably less than 20 ppm di- and trivalent metals. The dyes may be purified using conventional techniques, for example ultra-filtration, reverse osmosis ion exchange or a combination of such methods.

According to a fourth aspect of the present invention there is provided an ink comprising a liquid medium and a dye according to the second or third aspect of the present invention.

The ink preferably comprises
(a) from 0.01 to 30 parts of a dye according to the second or third aspect of the present invention; and
(b) from 70 to 99.99 parts of a liquid medium;
wherein all parts are by weight and the number of parts of (a)+(b)=100.

The number of parts of component (a) is preferably from 0.1 to 20, more preferably from 0.5 to 15, and especially from 1 to 5 parts.

The preferred compounds and compositions in the ink are as hereinbefore defined in relation to the second and third aspects of the invention.

Component (a) of the ink may contain a single dye or a mixture comprising two or more dyes. A preferred mixture comprises a dye of the Formula (10) and a dye of the Formula (2) as defined in relation to the second or third aspect of the invention. Another preferred mixture comprises a dye of the Formula (10) and a dye of the Formula (4) as defined in relation to the second or third aspect of the invention.

The number of parts of component (b) is preferably from 99.9 to 80, more preferably from 99.5 to 85, especially from 99 to 95 parts.

Preferably component (a) is completely dissolved in component (b). More preferably component (a) has a solubility in component (b) at 20° C. of at least 10% by weight. This allows the preparation of concentrates which may be used to prepare more dilute inks and reduces the chance of the dye precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvent(s) are selected from $C_{1-6}$-alkanols, for example methanol, ethanol, n-propanol, isopropanol, n-butanol, sec-butanol, tert-butanol, isobutanol and n-pentanol; cyclic alkanols, for example cyclohexanol and cyclopentanol; diols, preferably diols with 2 to 12 carbon atoms, for example pentane-1,5-diol and hexane-1,6-diol; amides, for example dimethylformamide or dimethylacetamide; amines, for example triethanolamine ethanolamine and diethanolamine; ketones or ketone-alcohols, for example acetone, methyl ether ketone, cyclohexanone and diacetone alcohol; ethers, for example tetrahydrofuran or dioxane; oligo- or poly-alkyleneglycols, for example diethylene glycol, triethylene glycol, hexylene glycol, polyethylene glycol and polypropylene glycol; alkyleneglycols or thioglycols containing a $C_2$–$C_6$-alkylene group, for example ethylene glycol, propylene glycol, butylene glycol, pentylene glycol hexylene glycol and thiodiglycol; polyols, for example glycerol and 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol, 2-(2-butoxyethoxy)ethanol and ethyleneglycolmonoallylether; cyclic amides, for example 2-pyrrolidone, N-methyl-2-pyrrolidone, N-ethyl-2-pyrrolidone, caprolactam and 1,3-dimethylimidazolidone; cyclic esters, for example caprolactone γ-butyrolactone; sulphoxides, for example dimethyl sulphoxide and sulpholane or mixtures containing two or more, especially from 2 to 8, of the aforementioned water-miscible organic solvents, for example thiodiglycol and a second glycol or diethylene glycol and 2-pyrrolidone.

Especially preferred water-miscible organic solvents are 2-pyrrolidone; N-methyl-pyrrolidone; alkylene- and oligoalkylene-glycols, for example ethyleneglycol, diethyleneglycol, triethyleneglycol; and lower alkyl ethers of polyhydric alcohols, for example 2-methoxy-2-ethoxy-2-ethoxyethanol; and polyethyleneglycols with a molecular weight of up to 500.

A preferred mixture of water and water-miscible organic solvents comprises:
(i) from 60 to 99.5 parts water; and
(ii) from 0.5 to 40 parts in total of one or more solvents selected from diethylene glycol, 2-pyrrolidone, N-methylpyrrolidone, cyclohexanol, caprolcatone, caprolactam, pentane-1,5-diol, 2-(2-butoxyethoxy) ethanol and thiodiglycol; wherein the parts are by weight and the sum of the parts (i) and (ii)=100.

Examples of further suitable ink media comprising a mixture of water and one or more organic solvent(s) are given in U.S. Pat. Nos. 4,963,189, 4,703,113, 4,626,284 and EP 4,251,50A which are incorporated herein by reference thereto.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) &/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

The dyes according to the second and third aspects of the present invention exhibit a high solubility in aqueous media. Accordingly it is preferred that the liquid medium is an aqueous medium, more preferably water or a mixture of water and one or more water-miscible organic solvent(s).

The ink may also contain additional components conventionally used in ink jet printing inks, for example viscosity and surface tension modifiers, corrosion inhibitors, biocides, kogation reducing additives and surfactants which may be ionic or non-ionic.

The inks provide prints which exhibit a high light-fastness. Furthermore, the inks are stable and exhibit reduced crusting when they are incorporated into an ink jet printer.

A fifth aspect of the invention provides a process for printing an image on a substrate comprising applying an ink containing a dye according to the second or third aspect of the invention to the substrate by means of an ink jet printer.

The preferred ink used in this process is an ink according to the fourth aspect of the present invention.

The ink jet printer preferably applies the ink to the substrate in the form of droplets which are ejected through a small orifice onto the substrate. Preferred ink jet printers are piezoelectric ink jet printers and thermal ink jet printers.

In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate used in the ink jet printing process is preferably paper, plastic, textile, metal or glass, more preferably paper, an overhead projector slide or a textile material, and especially paper.

Preferred papers are plain or treated papers which may have an acid, alkaline or neutral character. Examples of commercially available papers include, HP Premium Coated Paper, HP Photopaper (all available from Hewlett Packard Inc), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper.

Preferred textile materials are natural, synthetic and semi-synthetic materials Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

According to a sixth aspect of the present invention there is provided a paper, an overhead projector slide or a textile material printed with an ink according to the fourth aspect of the invention, or by means of a process according to the fifth aspect of the invention.

According to a seventh aspect of the present invention there is provided an ink jet printer cartridge comprising a chamber and an ink, the ink being present in the chamber and wherein the ink contains a dye according to the second or third aspect of the invention. Preferably the ink is an ink according to the fourth aspect of the present invention.

According to an eighth aspect of the present invention there is provided an ink jet printer containing an ink jet printer cartridge, wherein the ink jet printer cartridge is as defined in the seventh aspect of the present invention.

The invention is further illustrated by the following Examples in which all parts and percentages are by weight unless otherwise stated.

EXAMPLE 1

Dye (1)

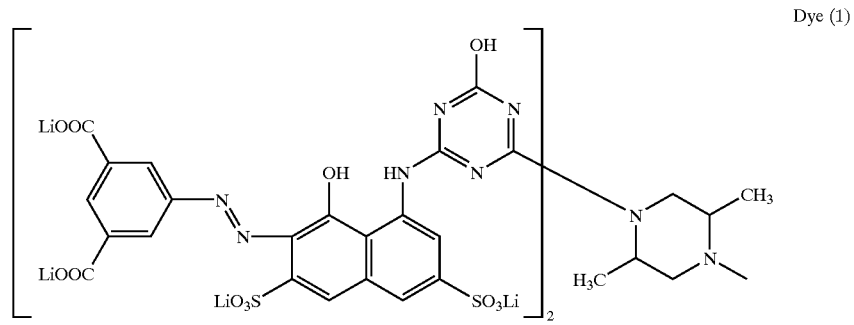

Dye (1)

Dye (1) was prepared as the sodium salt using the method described in Example 3 of PCT publication number WO 94/16021. The sodium salt was converted to the lithium salt using stages (a) and (b) described below:

Stage (a)

The sodium salt of the dye (5 g) was dissolved in distilled water (100 g) with stirring. Hydrochloric acid (1M) was added to reduce the pH to <2. The mixture was then stirred for 30 minutes to allow complete precipitation. The resulting slurry was filtered through a 0.45 μm filter and air dried. The solid was slurried in 0.2M hydrochloric acid (50 ml) filtered and air dried. This procedure was repeated three times.

Stage (b)

The product of stage (a) was dispersed in distilled water (100 g) and the pH adjusted to 9.5 with lithium hydroxide. The solution was freeze dried to give the title product.

Comparative (1)
  The sodium salt of Dye (1).
Comparative (2)
  The ammonium salt of Dye (1).
  Comparative (2) was made by converting the sodium salt of Dye (1) to the ammonium salt by the process described in stages (a) and (b) above, except that in stage (b) there was used ammonia in the place of LiOH.
Dye (2)

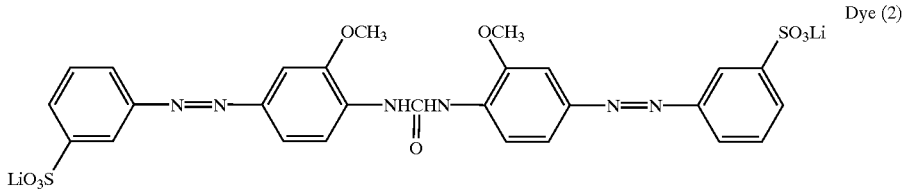

The sodium salt of Dye (2) is commercially available from Zeneca Limited as C.I. Direct Yellow 132. The sodium salt was converted to the lithium salt using the process described above for Dye (1).
Comparative (3)
  The sodium salt of Dye (2).
Comparative (4)
  The ammonium salt of Dye (2).
  Comparative (4) was prepared by converting the sodium salt of Dye (2) to the ammonium salt using the process described above for Comparative (2).
Dye (3)

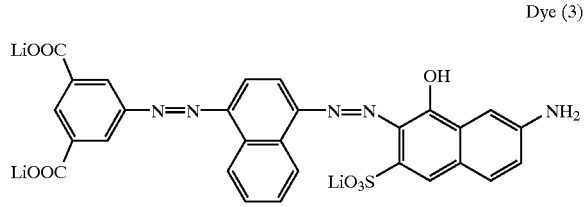

The sodium salt of Dye (3) was prepared using the process described in Example 2 of EP 0 356 080. The sodium salt was then converted to the lithium salt using the process described above for Dye (1).
Comparative (5)
  The sodium salt of Dye (3).
Comparative (6)
  The ammonium salt of Dye (3).
  Comparative (6) was prepared by converting the sodium salt to the lithium salt using the same process described above for Comparative (2).
Inks
  The inks shown in Table 1 comprised:
  3.5 parts of the dye shown in the second column of Table 1;
  5.0 parts 2-pyrrolidone;
  5.0 parts thiodiglycol;
  2.0 parts Surfynol 465 (a surfactant available from Air Products Inc.); and
  84.5 parts water.

Each ink was prepared by dissolving the Dye shown in the second column of Table 1 (0.35 g) in water (8.45 g) by adding ammonia and adjusting the pH to 9.5. 2-pyrrolidone (0.5 g), thiodiglycol (0.5 g) and Surfynol 465 (0.2 g) were then added and the mixture was stirred at ambient temperature. The resulting solution was filtered through a 0.45 μm filter to give the ink.

Ink Jet Printing

Each ink shown in Table 1 was loaded into a HP 560 ink jet printer and was applied to Xerox Acid paper using the ink jet printer. When the resulting prints had dried a portion of the print was mounted, half covered, and faded in an Atlas Ci35a weatherometer.

The light-fastness of the prints was assessed by measuring the colour difference (ΔE) between the faded and unfaded portions of the print using an X-Rite 939 spectrodensitometer. The time shown in the column marked ΔE in Table 1 refers to the number of hours the print was faded for in the weatherometer.

A low ΔE value indicates a small colour change after fading in the weatherometer and therefore a high light-fastness.

Table 1 clearly show that the lithium salts of the dyes resulted in prints which exhibit a high light fastness compared with sodium and ammonium salts.

TABLE 1

| Ink Dye | | Salt | ΔE (50 hours) | ΔE (64 hours) | ΔE (100 hours) |
|---|---|---|---|---|---|
| 1 | Dye (1) | Li | — | — | 18.8 |
| 2 | Comparative (1) | Na | — | — | 19.8 |
| 3 | Comparative (2) | NH$_4$ | — | — | 28.2 |
| 4 | Dye (2) | Li | 8.45 | — | — |
| 5 | Comparative (3) | Na | 10.77 | — | — |
| 6 | Comparative (4) | NH$_4$ | 11.97 | — | — |
| 7 | Dye (3) | Li | — | 4.1 | — |
| 8 | Comparative (5) | Na | — | 4.5 | — |
| 9 | Comparative (6) | NH$_4$ | — | 6.4 | — |

EXAMPLE 2

Dye (A)

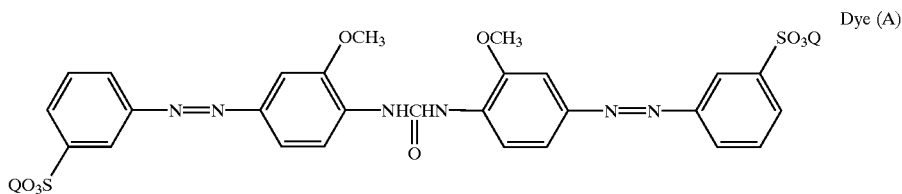

wherein the cations represented by Q are a mixture of sodium and lithium cations and the molar ratio of lithium::sodium cations is 1:1.5.

Dye (A) was prepared by mixing 60 parts of the sodium salt of Dye (A) (available C.I. Direct Yellow 132 from Zeneca Limited) with 40 parts of the lithium salt of Dye (A) (i.e. Dye (2) described in Example 1).

Dye (B)

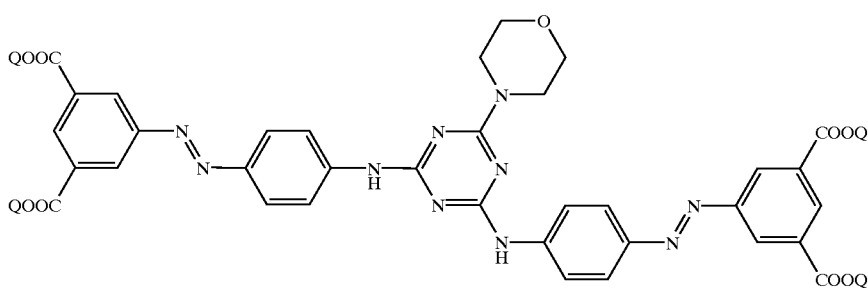

wherein the cations represented by Q are a mixture of sodium and lithium cations and the molar ratio of lithium::sodium cations is 1:1.5.

The sodium salt of Dye (B) was prepared using the method described in Example 10 of EP 468 747. The sodium salt was then converted to the lithium salt using the process described above for Dye (1). Dye (B) was prepared by mixing 60 parts of the sodium salt of the dye with 40 parts of the lithium salt of the dye.

Aqueous Solubility

The weight % solubility of Dye (A), Dye (B) and the individual sodium and lithium salts of Dyes (A) and (B) in water at a pH of 9.5 and a temperature of 20° C. were measured. The results of the solubility measurements are shown in Table 2.

Light-Fastness

The light-fastness of Dyes (A) and (B) and the individual sodium and lithium salts thereof were measured as described in Example 1; namely by ink jet printing an ink containing the each dye onto Xerox Acid paper and fading the prints using an Xrite Weatherometer. The light-fastness of each dye after 50 hours of fading is shown in Table 2.

TABLE 2

| Dye | Light-Fastness (after 50 hours) | Solubility (wt % in water at pH 9.5)) |
| --- | --- | --- |
| Dye (A) | 7 | 16 |
| Sodium Salt of Dye (A) | 11 | 11 |

TABLE 2-continued

| Dye | Light-Fastness (after 50 hours) | Solubility (wt % in water at pH 9.5)) |
| --- | --- | --- |
| Lithium Salt of Dye (A) | 9 | 13 |
| Dye (B) | 4 | 19 |
| Sodium Salt of Dye (B) | 6 | 9 |
| Lithium Salt of Dye (B) | 5 | 10 |

Table 2 clearly shows that the mixed sodium lithium salts represented by Dyes (4) and (5) exhibit a surprisingly high aqueous solubility and light-fastness compared to the solubility and light-fastness of the individual sodium and lithium salts of the respective dyes.

EXAMPLE 3

Inks

The inks described in Tables 3, 4 and 5 may be prepared wherein the Dye described in the second column is the Dye described below. Numbers quoted in the third column onwards refer to the number of parts of the relevant ingredient and all parts are by weight. The inks may be applied to paper by thermal or piezo ink jet printing.

The following abbreviations are used in Tables 3, 4 and 5:

| | |
|---|---|
| PG = propylene glycol | DEG = diethylene glycol |
| NMP = N-methyl pyrrolidone | TFP = 2,2,3,3-tetrafluoropropanol |
| CYC = cyclohexanol | 2P = 2 pyrrolidone |
| P12 = propane-1,2-diol | UR = Urea |
| CET = cetyl ammonium bromide | PHO = $Na_2HPO_4$ and |
| TBT = tertiary butanol | TDG = thiodiglycol |
| GLY = glycerol | P-1,5 = Pentane-1,5-diol |
| H - 1,6 = Hexane 1,6-diol | CAP = caprolactone |
| CAP-L = caprolactam | TEA = triethanolamine |
| EG = ethylene glycol | BUT = γ-butyrolactone |

DEG-MBE=diethylene glycol monobutyl ether
PEG 200=Polyethylene glycol (average molecular weight of 200)
Dyes (1), (2) and (3) are the dyes described in Example 1;
Dye (4)=the lithium salt of the dye of the hereinbefore defined Formula (13);
Dye (5)=the lithium salt of the dye of the hereinbefore defined Formula (14);
Dye (6)=the lithium salt of the dye of the hereinbefore defined Formula (15);
Dye (7)=the lithium salt of the dye of the hereinbefore defined Formula (16);
Dye (8)=the lithium salt of the dye of the hereinbefore defined Formula (17);
Dye (9)=the lithium salt of the dye of the hereinbefore defined Formula (18);
Dye (10)=the lithium salt of the dye of the hereinbefore defined Formula (19);
Dye (11)=the lithium salt of the dye of the hereinbefore defined Formula (20); and
Dye (12)=the lithium salt of the dye of the hereinbefore defined Formula (21).

TABLE 3

| Ink | Dye | Dye Content | Water | PG | DEG | NMP | P-1,5 | TEA | CYC | BUT | CAP | EG | CAP-L |
|---|---|---|---|---|---|---|---|---|---|---|---|---|---|
| 10 | 3 | 3.0 | 90 | | 5 | 4.8 | | 0.2 | | | | | |
| 11 | 2 | 10.0 | 85 | 3 | | 3 | 3 | | | 5 | | | |
| 12 | 4 | 2.1 | 91 | | 8 | | | | | | | 1 | 1 |
| 13 | 5 | 3.1 | 86 | 5 | | | | | 0.2 | 4 | | | 4.8 |
| 14 | 6 | 1.1 | 81 | | | 9 | | 0.5 | 0.5 | | | | |
| 15 | 7 | 2.5 | 60 | 4 | 15 | 3 | 3 | | | 6 | | 9 | 4 |
| 16 | 8 | 5 | 65 | | 20 | | 5 | | | 10 | | 5 | |
| 17 | 9 | 2.4 | 75 | 5 | 4 | | 5 | | | | 6 | | 5 |
| 18 | 10 | 4.1 | 80 | 3 | 5 | 2 | 9.7 | | 0.3 | | | | |
| 19 | 11 | 3.2 | 65 | | 5 | 4 | 6 | | | 5 | 4 | | 5 |
| 20 | 12 | 5.1 | 96 | | | | | | | | 4 | 6 | |
| 21 | 2 | 10.8 | 90 | 5 | | | | | | 5 | | | |
| 22 | 4 | 10.0 | 80 | 2 | 6 | 2 | 5 | | | 1 | | | |
| 23 | 5 | 1.8 | 80 | | 5 | | | | | | | 4 | |
| 24 | 6 | 2.6 | 84 | | | 11 | | | | | | 15 | |
| 25 | 7 | 3.3 | 80 | 2 | | | 10 | | | | 2 | 5 | 6 |
| 26 | 9 | 12.0 | 90 | | | | 7 | 0.3 | | 2.7 | | | |
| 27 | 12 | 5.4 | 69 | 2 | 20 | 2 | 1 | | | | | 3 | 3 |

TABLE 4

| Ink | Dye | Dye Content | Water | GLY | DEG | NMP | CET | TBT | TDG | UR | PHO | 2P | PI2 |
|---|---|---|---|---|---|---|---|---|---|---|---|---|---|
| 28 | 1 | 3.0 | 80 | 15 | | | 0.2 | | | | | 4.8 | |
| 29 | 2 | 9.0 | 90 | | 5 | | | | | | 1.2 | | 5 |
| 30 | 3 | 1.5 | 85 | 3.8 | 5 | | 0.16 | 4.64 | 0.2 | | | | |
| 31 | 4 | 2.5 | 90 | | 6 | 3.88 | | | | | 0.12 | | |
| 32 | 5 | 3.1 | 82 | 4 | 8 | | 0.3 | | | | | | 5.7 |
| 33 | 6 | 0.9 | 85 | | 10 | | | | | 4.8 | 0.2 | | |
| 34 | 7 | 8.0 | 90 | | 4.7 | 5 | | | 0.3 | | | | |
| 35 | 8 | 4.0 | 70 | | 10 | 4 | | | | 1 | | 4 | 11 |
| 36 | 9 | 2.2 | 75 | 4 | 10 | 3 | | | | 2 | | 6 | |
| 37 | 10 | 10.0 | 91 | | | 6 | | | | | | 3 | |
| 38 | 12 | 9.0 | 76 | | 9 | 7 | | 2.05 | | | 0.95 | 5 | |
| 39 | 11 | 5.0 | 78 | 5 | 11 | | | | | | | 6 | |
| 40 | 1 | 5.4 | 86 | | | 7 | | | | | | 7 | |
| 41 | 2 | 2.1 | 70 | 5 | 5 | 5 | 0.1 | 0.2 | 0.1 | 5 | 0.1 | 9.5 | |
| 42 | 1 | 2.0 | 90 | | 10 | | | | | | | | |
| 43 | 10 | 2 | 88 | | | 2 | | | 10 | | | | |
| 44 | 9 | 5 | 78 | | | 5 | | | 12 | | | 5 | |
| 45 | 10 | 8 | 70 | 2 | | 8 | | | 15 | | | 5 | |
| 46 | 8 | 10 | 80 | | | | | | 8 | | | 12 | |
| 47 | 7 | 10 | 80 | | 10 | | | | | | | | |

TABLE 5

| Ink | Dye | Dye Content | Water | PEG 200 | DEG-MBE | NMP | H-1,6 | TEA | TFP | BUT | CAP | EG | CAP-L |
|---|---|---|---|---|---|---|---|---|---|---|---|---|---|
| 48 | 1 | 2.0 | 80 | 5 | | 6 | 4 | | | | | 5 | |
| 49 | 2 | 3.0 | 90 | | 5 | 4.8 | | 0.2 | | | | | |
| 50 | 2 | 10.0 | 85 | 3 | | 3 | 3 | | | 5 | | 1 | |
| 51 | 4 | 2.1 | 91 | | 8 | | | | | | | | 1 |
| 52 | 5 | 3.1 | 86 | 5 | | | | | 0.2 | 3.8 | | | 5 |
| 53 | 6 | 1.1 | 81 | | | 9 | | 0.5 | 0.5 | | | 9 | |
| 54 | 7 | 2.5 | 60 | 4 | 15 | 3 | 3 | | | 6 | | 5 | 4 |
| 55 | 8 | 5 | 65 | | 20 | | | | | 10 | | | |
| 56 | 9 | 2.4 | 75 | 5 | 4 | | 5 | | | | 6 | | 5 |
| 57 | 10 | 4.1 | 80 | 3 | 5 | 2 | 9.7 | | 0.3 | | | | |
| 58 | 11 | 3.2 | 70 | | 5 | 4 | 6 | | | 5 | 4 | 6 | 5 |
| 59 | 12 | 5.1 | 96 | | | | | | | | 4 | | |
| 60 | 3 | 10.8 | 90 | 5 | | | | | | 5 | | | |
| 61 | 4 | 10.0 | 80 | 2 | 6 | 2 | 5 | | | 1 | | 4 | |
| 62 | 5 | 1.8 | 80 | | 5 | | | | | | | 15 | |
| 63 | 1 | 2.6 | 84 | | | 11 | | | | | | 5 | |
| 64 | 7 | 3.3 | 80 | 2 | | | 10 | | | | 2 | | 6 |
| 65 | 8 | 12.0 | 90 | | | | 7 | 0.3 | | 2.8 | | | |
| 66 | 9 | 5.4 | 69 | 2 | 20 | 2 | 1 | | | | | 3 | 3 |
| 67 | 2 | 6.0 | 91 | | | 4 | | | | | | 5 | |

What is claimed is:

1. A dye selected from C.I. Reactive Red 180, C.I. Acid Red 52 and a dye having one of the following formulae, wherein the dye is in the lithium salt form:

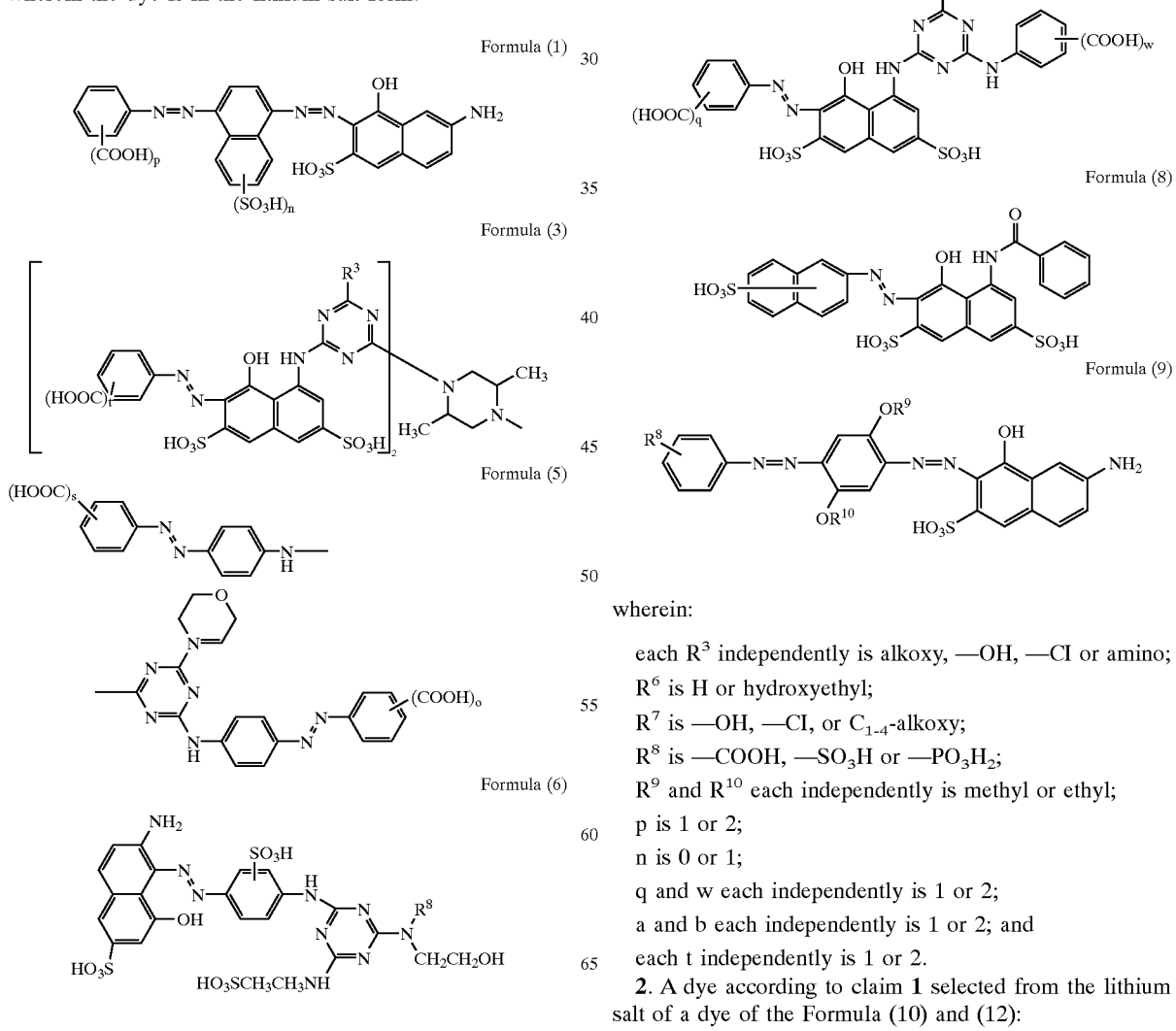

wherein:

each $R^3$ independently is alkoxy, —OH, —Cl or amino;

$R^6$ is H or hydroxyethyl;

$R^7$ is —OH, —Cl, or $C_{1-4}$-alkoxy;

$R^8$ is —COOH, —SO$_3$H or —PO$_3$H$_2$;

$R^9$ and $R^{10}$ each independently is methyl or ethyl;

p is 1 or 2;

n is 0 or 1;

q and w each independently is 1 or 2;

a and b each independently is 1 or 2; and each t independently is 1 or 2.

2. A dye according to claim 1 selected from the lithium salt of a dye of the Formula (10) and (12):

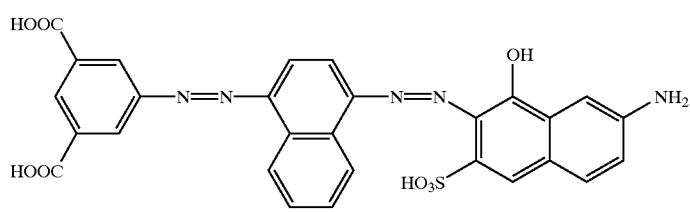

Formula (10)

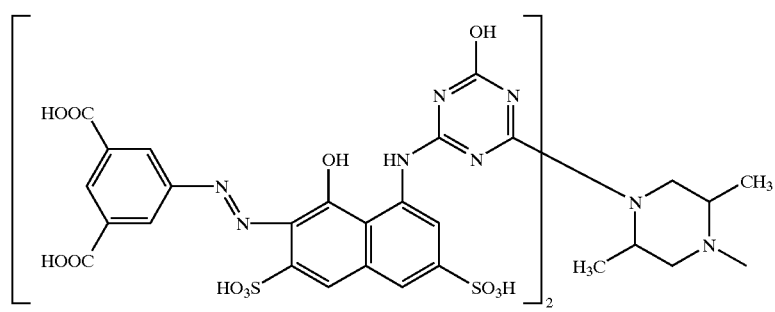

Formula (12)

3. An anionic dye selected from C.I. Direct Black 19, C.I. Reactive Red 180, C.I. Acid Red 52 and a dye having one of the Formulae as defined in claim 1, wherein the anionic dye is in the form of a salt with a mixture of cations wherein;

(i) the cations comprise a mixture of lithium and sodium cations;

(ii) at least 20 mole % of the total cations are lithium cations; and (iii) the molar ratio of the lithium to sodium cations is from 1:4 to 99:1.

4. An ink comprising a liquid medium and a dye according to any one of claims 1 to 3.

5. A process for printing an image on a substrate comprising applying an ink containing a dye according to any one of claims 1 to 3 the substrate by means of an ink jet printer.

6. A paper, an overhead projector slide or a textile material printed with an ink according to claim 4.

7. An ink jet printer cartridge comprising a chamber and an ink, the ink being present in the chamber and wherein the ink contains a dye according to any one of claims 1 to 3.

8. An ink jet printer containing an ink jet printer cartridge, wherein the ink jet printer cartridge is as defined in claim 7.

9. In a method of applying anionic dye to a substrate by ink jet printing, the improvement whereby the anionic dye is in the form of a salt having cations including both lithium and sodium cations of which at least 20 mole % are lithium cations thereby improving the light fastness of said dye.

10. The method of claim 9 wherein the molar ratio of lithium to sodium cations in the anionic dye is from 1:4 to 99:1.

11. The method of claim 9 wherein the anionic dye is a water-soluble dye containing at least as many carboxylic groups as sulpho groups.

* * * * *